United States Patent [19]
Penicaud et al.

[11] 3,935,403
[45] Jan. 27, 1976

[54] DEVICE FOR DEVELOPING A NEUTRALIZATION SIGNAL FOR AN ECHO SUPPRESSOR

[75] Inventors: Etienne Penicaud, Chaville; Maurice Lienard, Marseille, both of France

[73] Assignee: Compagnie Industrielle des Telecommunications Cit-Alcatel, France

[22] Filed: Aug. 6, 1974

[21] Appl. No.: 495,213

[30] Foreign Application Priority Data
Aug. 8, 1973   France .............................. 73.29024

[52] U.S. Cl. .......... 179/170.2; 178/58 R; 340/171 R
[51] Int. Cl.² .......................................... H04B 3/20
[58] Field of Search........... 179/170.2, 170.4, 170.6, 179/170.8, 175.31 E, 15 AD; 340/147 F, 171 R; 178/58 R

[56] References Cited
UNITED STATES PATENTS

| | | | |
|---|---|---|---|
| 3,069,501 | 12/1962 | Gilman et al. | 179/170.2 |
| 3,647,993 | 3/1972 | Foulkes et al. | 179/170.2 |
| 3,783,194 | 1/1974 | Vilips et al. | 179/170.2 |

*Primary Examiner*—Douglas W. Olms
*Attorney, Agent, or Firm*—Craig & Antonelli

[57] ABSTRACT

The invention comes within the branch of digital data transmission on a telephone line having four wires comprising echo suppressors. In order to be able to neutralize these suppressors during a simultaneous bilateral data transmission, a neutralization signal is developed in a purely digital device basically using a PCM coder, counting the changes in sign of the line signal. The use of digital filters to identify the characteristic frequency preceding the transmission is thus avoided.

8 Claims, 7 Drawing Figures

DEVICE FOR DEVELOPING A NEUTRALIZATION SIGNAL FOR AN ECHO SUPPRESSOR

The invention concerns a device for developing a neutralizing signal for an echo suppressor, necessary for the transmission of data on a telephone line having four wires, each data transmission being preceded by an identification signal at a given frequency.

Telephone communications over long distances are made by means of lines having four wires, whereas connection with subscribers is made with lines having two wires. The transformation between the two systems is effected by means of a differential transformer.

Lines used for communications over long distances have an impedance of 600 ohms. The impedance of extension lines for circuits towards subscribers is variable, both from one line to another and as a function of the frequency. Differential transformers cause, when that impedance is not equal to 600 ohms, return currents which are superimposed on the conversation currents and sometimes bring about a considerable hindrance. That hindrance increases with the amplitude of the currents and the time taken by those currents to pass through the reaction loop, that is, the propagation time for the outgoing current and the return current. If that time reaches 100 milliseconds, the return currents are received as genuine echos. To ensure good communications, it is necessary to fit the circuits on which the propagation time for the outgoing current and the return current exceeds 70 milliseconds with two half-echo suppressors.

Nevertheless, if it is required to transmit digital data in both directions simultaneously on a circuit having four wires fitted with an echo suppressor, the echo suppressor must previously be neutralized, otherwise, the carrier is weakened in one transmission direction, this being detrimental to the signal-to-noise ratio of the data transmission and thus increasing the proportion of errors. The holding in the rest position of each half-echo suppressor is provided for by a device called a neutralizer.

The operation of the neutralizer is subject to conversations which have been approved by the C.C.I.T.T. and registered in the special report of the C.C.I.T.T., volume III, notice G161.

According to that notice, the identification signal preceding a data transmission is emitted at the frequency of 2100 c/s ± 15 c/s at the level of −12 ± 6 dBmO (that indication showing the weakening in dB in relation to a signal of 1 milliwatt in a line having an impedance of 600 ohms). The duration of the identification signal is 400 milliseconds. Because of the gains and losses due to the transmissions, the neutralizer must operate under the effect of a signal having a frequency of 2100 c/s ± 21 c/s at a level comprised between 0 and −31 dBmO. Neutralization is tolerated for a signal comprised between 1900 and 2350 c/s at a level comprised between 0 and −35 dBmO. The neutralizer must function after a time equal to 300 ± 100 milliseconds.

On ordinary telephone circuits, the neutralizers designed according to that international notice use the analog filtering technique. On the other hand, the inserting of these neutralizers at a point where the signal is in digital form requires the use of other methods. That generally used, namely, the simple transposition of the analog techniques, leads to the use of digital filters which are slow devices (and hence do not enable a multiplexing of a very high order) and are expensive.

The invention concerns a device for developing a neutralization signal for an echo suppressor which no longer has the defects observed in known devices. That device according to the invention is characterized in that it comprises a first counter producing a first neutralization condition when the time between two zeros of the line signal does not exceed a pre-established value, in that it comprises a second counter which counts the changes in sign during a predetermined period and produces a second neutralization condition when the state of the counter at the end of the said period is between two predetermined limits and in that it comprises a circuit for triggering a flip-flop providing the neutralizing signal, that circuit combining the said two conditions and comprising a shift register which triggers the flip-flop only when the neutralization conditions are combined several times in succession.

To great advantage, that device comprises, moreover, a monostable circuit which is triggered when the line signal exceeds a predetermined minimum level and which resets the flip-flop supplying the neutralization signal to zero when it returns to the stable state.

Due to the fact that the device is, to a great extent, digital, it is an advantage to combine it with an analog-to-PCM converter which supplies in binary terms the passes through zero and the minimum level of the line signal as well as a basic clock used for defining the various periods.

The invention will be disclosed by means of the following detailed description which concerns a preferred example of embodiment of the invention, with reference to FIGS. 1 to 7.

Figure 1:
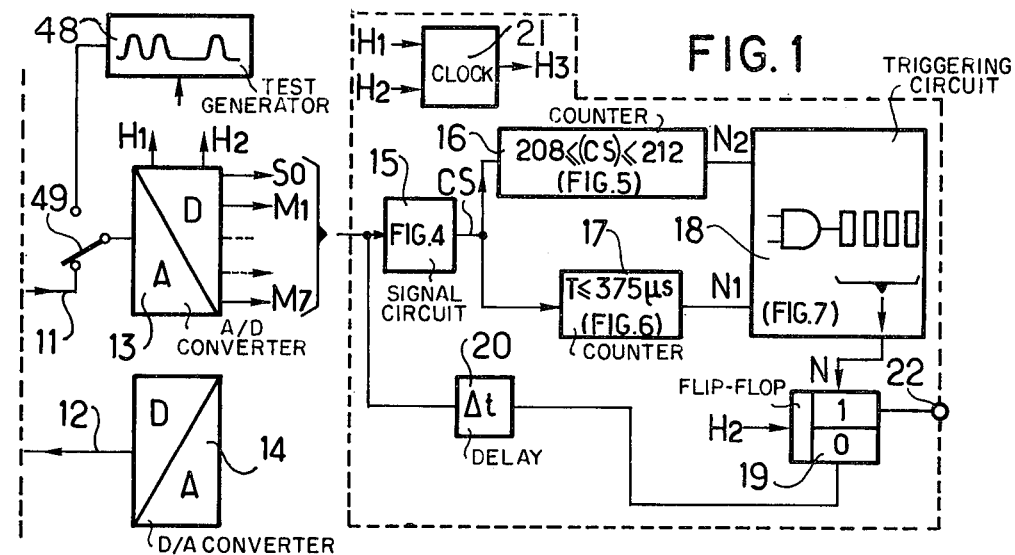
FIG. 1 shows a general diagram of the device according to the invention.

FIGS. 4 to 7 finally show in greater detail certain sub-assemblies of the device according to FIG. 1.

As has been mentioned above, the device according to the invention is combined with an analog-to-digital convertor which transforms the analog line signal into binary terms sending out at each sampling instant (whose period is chosen as 125 microseconds) a binary word having eight bits comprising a sign bit and seven amplitude bits. It is therefore possible to evaluate the neutralization signal by logic means and, through binary values indicating the change in sign, the required value of the signal and different periods.

The device according to the FIG. 1 fulfills the four conditions necessary for the triggering of the neutralization signal: the neutralization signal must be triggered if the number of passes through zero of the line signal in a period of 50 milliseconds is comprised between 208 and 212, if the number of successive samples having the same sign does not exceed 3, if the level of the signal is greater than −34 dBmO and if the three preceding conditions are complied with during a period comprised between 200 and 285 milliseconds.

The neutralization signal must be stopped when the level of the signal remains for at least 230 milliseconds below the value of −34 dBmO. That time is called the holding time.

With reference to FIG. 1, it will be seen that the line towards the subscriber comprises two unidirectional circuits 11 and 12 respectively on which the line signal is transmitted in analog code and at low frequency. The figure does not show the half-echo suppressor comprising a neutralization input to enable the simultaneous transmission of the digital data on the two circuits. That figure does not show, either, the line equipment units and the switching devices. Nevertheless, it shows two analog-to-digital and digital-to-analog convertors respectively 13 and 14 enabling the transposing of the analog signal into a PCM (pulse code modulation) and vice-versa.

The device according to the invention comprises, in the example described, several logic blocks 15 to 21 a first of which, 15, develops a binary signal at the sampling instant when the line signal changes signs. That signal is applied to two other blocks, 16 and 17, the first of which effects a counting of the change in signs during the 50-millisecond period and the second of which checks that the change of sign signal is applied at least once every three sampling instants.

The outputs of the two blocks 16 and 17 are then applied together to a block 18 comprising a shift register and sending out a neutralization signal when the sub-conditions developped in the blocks 16 and 17 are combined together during four successive cycles of 50.125 milliseconds. In that case, it sets a flip-flop in its "neutralization" position in which an output 22 connected to the neutralization input of an echo suppressor is actuated. That flip-flop is reset to the rest position by the signal leaving a monostable element 20 whose instability period corresponds to the above-mentioned holding time. That monostable element is therefore triggered by the outputs of the converter 13 corresponding to a level of the line signal below −34 dBmO.

Figure 2:
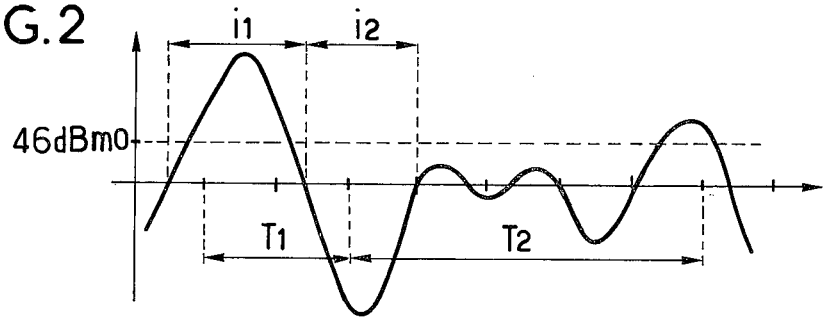
FIG. 2 shows the typical line signal and the sampling instants of that signal.

Before describing in detail the various blocks mentioned, a few characteristics of the analog-to-digital conversion in PCM should be set forth for reference. A characteristic input signal of such a convertor is shown in FIG. 2. The frequencies existing in that signal are comprised between 300 and 3400 c/s. Sampling is effected at the frequency of 8000 c/s and the amplitude at each sampling instant is converted into a binary byte comprising seven amplitude bits and a sign bit. It has been adopted as a convention to combine, at the level of −46 dBmO, the seven bits (from M1 up to M7) 0001000 and, at the value of −34 dBmO, the seven bits 0100000. All the values below −46 dBmO and only those latter are coded in zero on the bits M1 to M4. All the values below −34 dBmO and only those latter are coded by zeros on M1 and M2. Those two levels therefore lend themselves particularly well to binary decoding.

For the purposes of the invention, it is sufficient to take into account the changes in sign only when it is connected with an amplitude of the signal exceeding the value of −46 dBmO. The periods T1 and T2 do not therefore correspond exactly to the periods i1, i2, etc. between two changes in sign. They are sometimes, because of the sampling, shifted in relation to the true period between two passes through zero and sometimes they are very much longer because of the fact that the passes through zero are neglected when the amplitude between two zeros is too slight.

Figure 3:
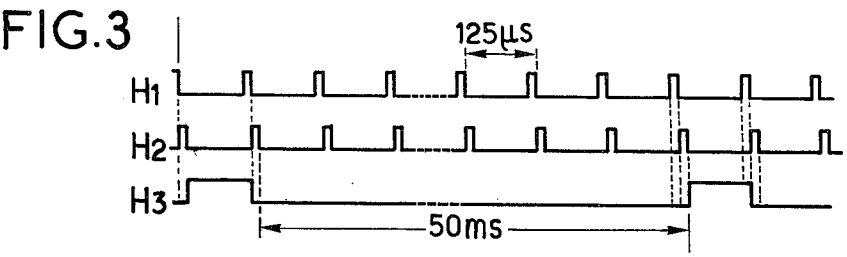
FIG. 3 shows three pulse trains by means of which the various operations of the device are synchronized.

The sampling instants are defined by a clock which supplies two pulse trains of 8 kc/s each, the second of which, H2, is slightly delayed with respect to the first, H1 (see FIG. 3). These pulse trains are applied in the device according to the invention to the block 21 which deduces therefrom a pulse train H3 (FIG. 3) having a periodicity of 50.125 milliseconds. The pulses H3 are synchronised with the trailing edge of the pulses H2 and their duration is limited by the front edge of the train H2. The block 21 comprises, therefore, a counter having a periodicity of 401 counting units or of 401/8 = 50.125 milliseconds. The three pulse trains H1, H2 and H3 are used for co-ordinating and controlling the operations of the other blocks of the device.

Figure 4:
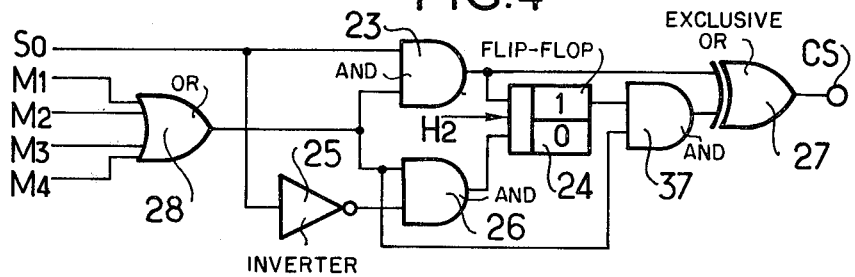

On referring to FIG. 4, which shows in greater detail the contents of the block 15 in FIG. 1 and which has as its function the developing of the signal indicating any change in sign, it will be seen that those signals which are sent out by the convertor 13 on the lines S0, M1, M2, M3 and M4 are used as input signals. The signal indicating the sign is applied through an AND gate 23 to an input of a bistable element 24 and through an invertor 25 and another AND gate 26 to the other input of that same bistable element. The bistable element changes states only in synchronism with the clock H2 and it triggers at each change in sign. An EXCLUSIVE OR gate 27 connected up between an input and an output of the said flip-flop checks any triggering and sends out at its output CS a pulse for each change in sign.

If, however, the change in sign is connected with a level of the line signal which is too weak, that is, below −46 dBmO, that is not noted, for the two AND gates 23 and 26 as well as an AND gate 37 connected up between the bistable element and the EXCLUSIVE OR gate are blocked. That blocking is obtained by an OR gate 28 bringing together the four bits having the highest values of the output of the convertor 13, which will all be zeros when the level of the signal is too slight.

Figure 5:
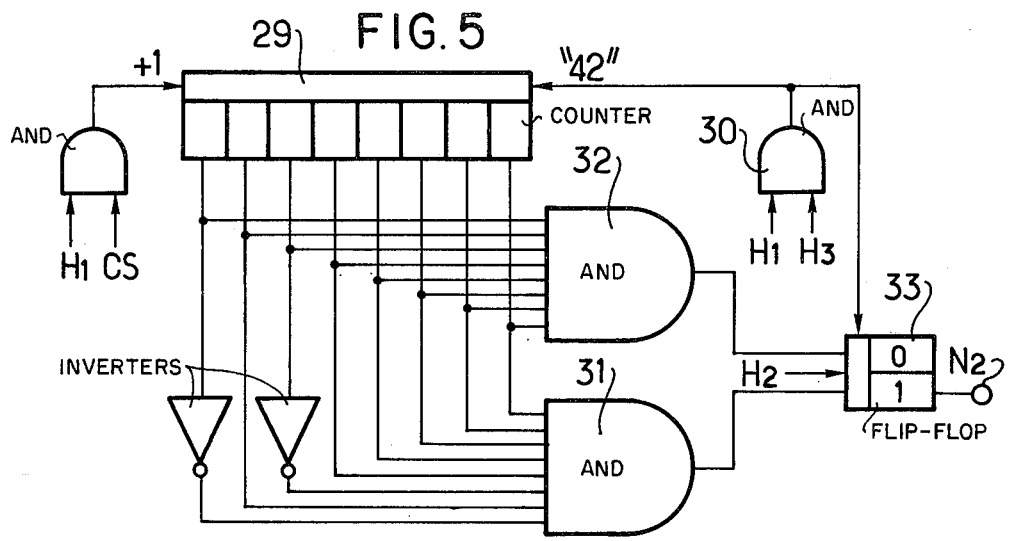

FIG. 5 shows in greater detail the contents of the block 16 according to FIG. 1. It should be stated for reference that this block has the function of accumulating the number of passes through zero or changes in sign during a period of 50 milliseconds and of sending out a first neutralization condition N2 when the number of changes in sign is comprised between 208 and 212. For that purpose, that block comprises mainly a counter having eight bits 29 which receives in synchronism with the clock H1 the pulses leaving, at CS, the gate 27, according to FIG. 4.

To make the decoding of the two critical states of the counter easier, it is not reset to zero after each counting period, but to the state corresponding to 42 (gate 30). The counter 208 is then reached at the state of the counter 250 and an AND gate 31 sends out a signal when the counter exceeds that state. A second AND gate 32 decodes the last state of the counter, the state 255, which corresponds to the two hundred and thirteenth change in sign of the line signal. The outputs of the two gates are connected to the two extra inputs of a bistable element 33 which is synchronized by the clock H2 and which sends out the neutralization condition N2, when, during a period of 50 milliseconds, the number of changes in sign is comprised between 208 and 212. At the end of each counting period, that bistable element is reset to zero at the same time as the counter is reset to 42.

Figure 6:
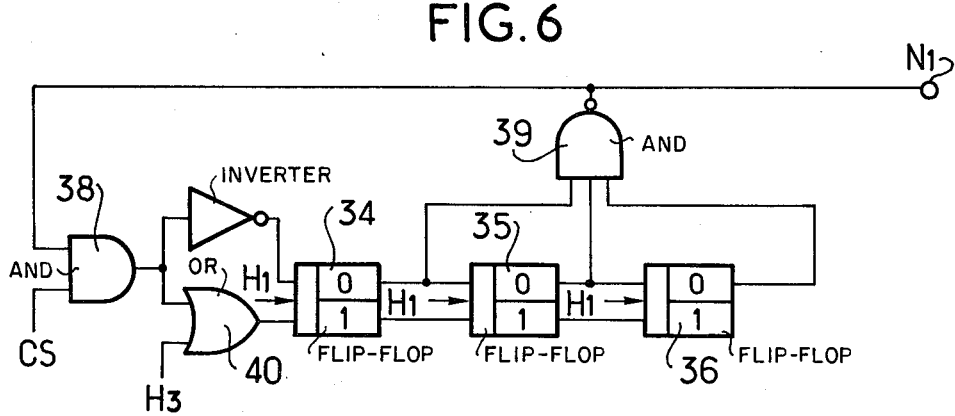

The block 17 in FIG. 1 is shown in detail in FIG. 6. That block has the function of supervising the number of successive changes in sign and of sending out a neutralization condition N1 only if at least among three successive samples there is one change in sign. The corresponding logic circuit therefore comprises three flip-flops 34 to 36 which are connected together as a shift register whose shift rhythm is indicated by the clock H1. The pulses of the changes in sign are applied to the register through an AND gate 38 which transmits, in normal cases, these pulses. If, however, three successive samples pass without a change in sign, all the flip-flops comprise zeros and a negative AND gate 39 which supervises the state of the register, sends out a blocking signal for the gate 38 and thus blocks the register in that state until the next pulse H3. The neutralization condition N1 is therefore not complied with during that period, but at the beginning of the following period, the first flip-flop 34 of the register is reset, through an OR gate 40, to its second state, thus enabling the unblocking.

Figure 7:
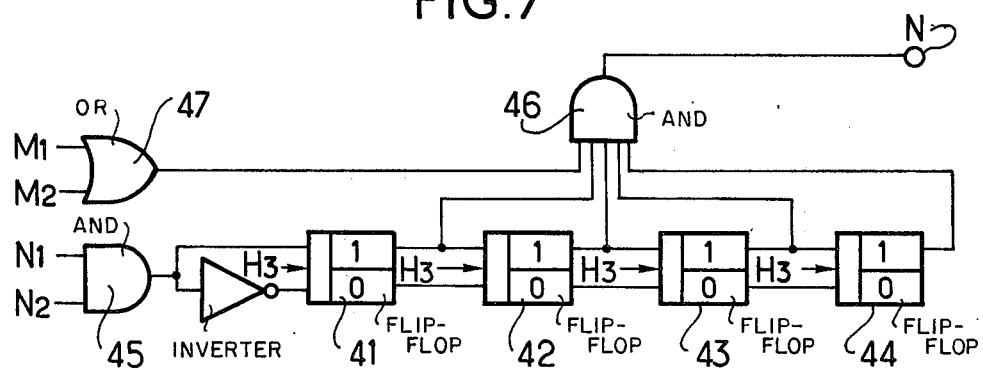

It has been stated, at the beginning, that the identification signal lasts 400 milliseconds and that the operating time of the device according to the invention must be at least 200 milliseconds to trigger the neutralizer. The block 18 in FIG. 1 whose contents are shown in FIG. 7 has the function of supervising four successive periods of 50 milliseconds and sends out a triggering signal N for the flip-flop 19 (see FIG. 1) only if the neutralization conditions are complied with during four successive periods. For that purpose, that block comprises another shift register having four flip-flops 41 to 44 which, this time, are synchronized by the front edge of the pulse H3. If, at the time of the appearance of that edge, the two conditions N1 and N2 are complied with, a pulse is sent out by a gate 45 combining those conditions and the first flip-flop of the register 41 is set in the state ONE. The whole register is set in that state only if the neutralization conditions were complied with four times in succession. Only in that case can an AND gate 46 send out at the output N a pulse to trigger the neutralization. That pulse is, however, sent out only if, at that time, the line signal is at least equal to −34 dBmO, this corresponding to a binary state ONE in at least one of the bits M1 and M2 (OR gate 47). That extra condition is therefore added in the AND gate 46 to the shift register filling condition.

The device described hereinabove constitutes only an example of embodiment of the invention complying with the standards of the C.C.I.T.T. inasmuch as concerns echo suppressors and pulse code modulation. It is possible to check regularly the proper operation of the device by means of a test sequence generator 48 which is shown in FIG. 1. That generator may be fed by the clock H1 of the convertor 13 and it produces different test sequences which may, by means of a switch 49, be sent into the convertor 13 and thus simulate particularly critical line signals inasmuch as concerns the triggering of the neutralization. That generator comprises, consequently, a counter which sends out successively the various sequences. As this is necessary only intermittently, it may be designed for several lines, operating in multiplex just like the analog-to-PCM convertor. The test sequence generator can send out on a second output (not shown) a signal which should correspond exactly to the signal at the output 22 of the device.

It is evident that the present invention is not limited to the structure used for the implementing of the various blocks. In practice, the negative logic system is indeed often used instead of the positive logic system, the latter lending itself, however, more easily to the presenting of the operation.

1. Device for developing a neutralization signal for an echo suppressor, necessary for the transmission of data on a telephone line having four wires, each transmission of data being preceded by an identification signal at a given frequency, said device comprising first counter means for producing a first neutralization condition when the time between two zeros of a line signal does not exceed a preestablished value, second counter means for counting changes in sign of said line signal during a predetermined period, said second counter means producing a second neutralization condition when the state of said second counter means at the end of said period is between two predetermined limits, and circuit means for triggering a flip-flop providing a neutralizing signal, said circuit means combining said two neutralization conditions, and said circuit means comprising shift register means for triggering said flip-flop only when said neutralization conditions are combined several times in succession and said line signal is at a level greater than a predetermined minimum value.

2. Device according to claim 1, wherein monostable circuit means are included for resetting said flip-flop, said monostable circuit means being triggered when said line signal exceeds said predetermined minimum level and wherein said monostable circuit means resets said flip-flop supplying said neutralizing signal to zero when said monostable circuit means returns to a stable state.

3. Device according to claim 2, further comprising analog/PCM convertor means for supplying in binary terms the passes through zero and said minimum level of said line signal and clock means for defining various time periods.

4. Device according to claim 1, further comprising test sequence generator means for checking at regular intervals the proper operation of the device.

5. Device according to claim 4, wherein said test sequence generator means is multiplexed with a plurality of transmission lines having devices for developing a neutralization signal.

6. Device according to claim 1, wherein means are included for developing a binary signal representative of said change in sign of said line signal, said binary signal being applied to said first and second counter means.

7. Device according to claim 6, further comprising analog/PCM convertor means for providing said line signal in binary terms, wherein said means for developing said binary signal representative of said change in sign of said line signal is operatively connected to the output of said analog/PCM convertor means.

8. Device according to claim 6, wherein said means for developing said binary signal includes logic circuit means for providing said binary signal representative of said change of sign of said line signal only when the level of said line signal exceeds a predetermined value.

* * * * *